United States Patent [19]
Fort et al.

[11] Patent Number: 5,865,210
[45] Date of Patent: Feb. 2, 1999

[54] VALVE ASSEMBLY

[75] Inventors: Edward Sagar Fort; David Bailey, both of Lancashire, England

[73] Assignee: Fort Valve Engineering Limited, Nelson, England

[21] Appl. No.: 441,832

[22] Filed: May 16, 1995

[30] Foreign Application Priority Data

May 19, 1994 [GB] United Kingdom ............... 9410089

[51] Int. Cl.⁶ ............................. F16K 43/00; F16K 1/226
[52] U.S. Cl. ................... 137/315; 251/148; 251/306; 251/367; 285/199
[58] Field of Search ............... 137/15, 315; 251/96, 251/98, 99, 103, 107, 108, 109, 305, 306, 307, 308; 285/197, 198, 199

[56] References Cited

U.S. PATENT DOCUMENTS

| | | | |
|---|---|---|---|
| 3,016,226 | 1/1962 | Freeman | 251/109 |
| 3,129,920 | 4/1964 | Stillwagon | 251/306 |
| 3,304,050 | 2/1967 | Fawkes | 251/306 |
| 3,306,316 | 2/1967 | Stillwagon | 251/306 |
| 3,329,394 | 7/1967 | Overbaugh | 251/99 |
| 3,399,863 | 9/1968 | Fawkes | 251/306 |
| 3,737,144 | 6/1973 | Duncan | 251/307 |
| 3,750,698 | 8/1973 | Wachle et al. | 251/305 |
| 3,840,042 | 10/1974 | Brundage | 251/306 |
| 3,874,631 | 4/1975 | Osthues | 251/306 |
| 4,332,271 | 6/1982 | Rohr | 251/305 |
| 4,653,725 | 3/1987 | Nanz et al. | 251/148 |
| 4,815,693 | 3/1989 | James et al. | 251/109 |
| 4,944,325 | 7/1990 | Baldwin et al. | 251/109 |
| 5,236,003 | 8/1993 | Habicht | 137/315 |

FOREIGN PATENT DOCUMENTS

| | | |
|---|---|---|
| 0114417 A2 | 8/1984 | European Pat. Off. . |
| 114 417 | 8/1984 | European Pat. Off. . |
| 2 630 189 | 4/1988 | France . |
| 2032579 | 5/1980 | United Kingdom ............... 251/99 |
| 2238094 | 5/1991 | United Kingdom . |

*Primary Examiner*—George L. Walton
*Attorney, Agent, or Firm*—Townsend and Townsend and Crew LLP

[57] ABSTRACT

A valve assembly has a valve body (10) which houses a pivotally mounted valve closure member (14) in the form of a valve closure flap secured to upper and lower spindles (16, 17). The valve housing is formed from two sections (20, 22) which are releasably secured together by means of an annular clamp (24) which engages with a peripheral upstanding rib (36) formed by the alignment of a flange (34) on one face of each of the valve housing sections.

The valve closure member is located in the vicinity of the junction of the two valve housing portions. The provision of a clamp permits the valve assembly to be dismantled extremely quickly in the event of service or repair of the valve assembly.

25 Claims, 5 Drawing Sheets

VALVE ASSEMBLY

The present invention relates to valve assemblies, and in particular, but not exclusively, to valve assemblies suitable for use in controlling the discharge of liquid or other flowable materials.

In general, a valve assembly comprises a valve housing within which a valve closure member is mounted to be movable out of and into engagement with a valve seat formed in the valve housing to open and close the valve and thereby regulate the flow of material therethrough. Many such valves are provided with a flexible valve seal with which the valve closure member engages when in its closed position, and such seals have to be changed from time to time to ensure that the valve can be closed properly. It is thus desirable to be able to dismantle the valve rapidly in order to reduce the time required for such operations and to reduce the cost involved therein.

Also, such valves have to be overhauled and/or cleaned from time to time. This is particularly important if the valves are used in a food environment, e.g. a valve for controlling the flow of milk or other dairy products. Such valves in particular must be cleaned frequently.

It is known to provide valve housings in a number of releasably securable sections, which are held together by a number of bolts when the valve is in use. When it is necessary to dismantle the valve, e.g. to replace a valve seal or to clean the valve, it is necessary to unscrew and remove the bolts before taking the valve housing sections apart. The dismantling and subsequent reassembly of such known valves is clearly a time-consuming and relatively labour-intensive task, which thus increases the cost of maintaining the valves in peak condition.

It is an object of the present invention to provide a valve assembly which can be dismantled and reassembled very quickly in order to facilitate servicing of the valve.

In accordance with the present invention, there is provided a valve assembly comprising a valve body and a valve closure member pivotally mounted within the valve body and pivotable between open and closed positions, the valve body comprising two valve body sections which in use abut each other to form the valve body, and a clamp which is engageable with the exterior of the valve body sections for releasably securing together the two valve body portions, the clamp comprising a collar which receives a spindle connected to the valve closure member, two arcuate arms pivotally mounted on opposite sides of the collar and means for releasably securing the two arcuate arms in position with respect to each other.

Such a valve assembly may be quickly and easily dismantled by means of the clamp, thereby facilitating servicing and/or cleaning of the valve assembly.

In a preferred embodiment, the valve closure member is pivotally mounted within the valve body, preferably at the junction of the two valve body portions. Conveniently, the valve closure member comprises mounting spindles which are pivotally mounted in apertures formed in the valve body, the spindle-receiving apertures being formed by co-operating recesses in the two valve body sections.

Preferably, the clamp is generally annular and is engageable with one or more projections in each of the valve body sections. The projections may in the form of a peripheral rim which is conveniently located adjacent to the abutment area of the valve body sections. In one embodiment, each peripheral rim forms part of a generally planar face of the respective valve body section, the generally planar faces of the two valve body sections, in use, abutting each other.

In one embodiment, the two arms are secured together by means of a swing bolt assembly.

The easy dismantling and re-assembly is particularly useful when the valve assembly further comprises a valve seal with which the valve closure member is engageable in order to close the valve. Such seals need to be replaced from time to time.

By way of example only, a specific embodiment of the present invention will now be described, with reference to the accompanying drawings, in which.

Figure 1:
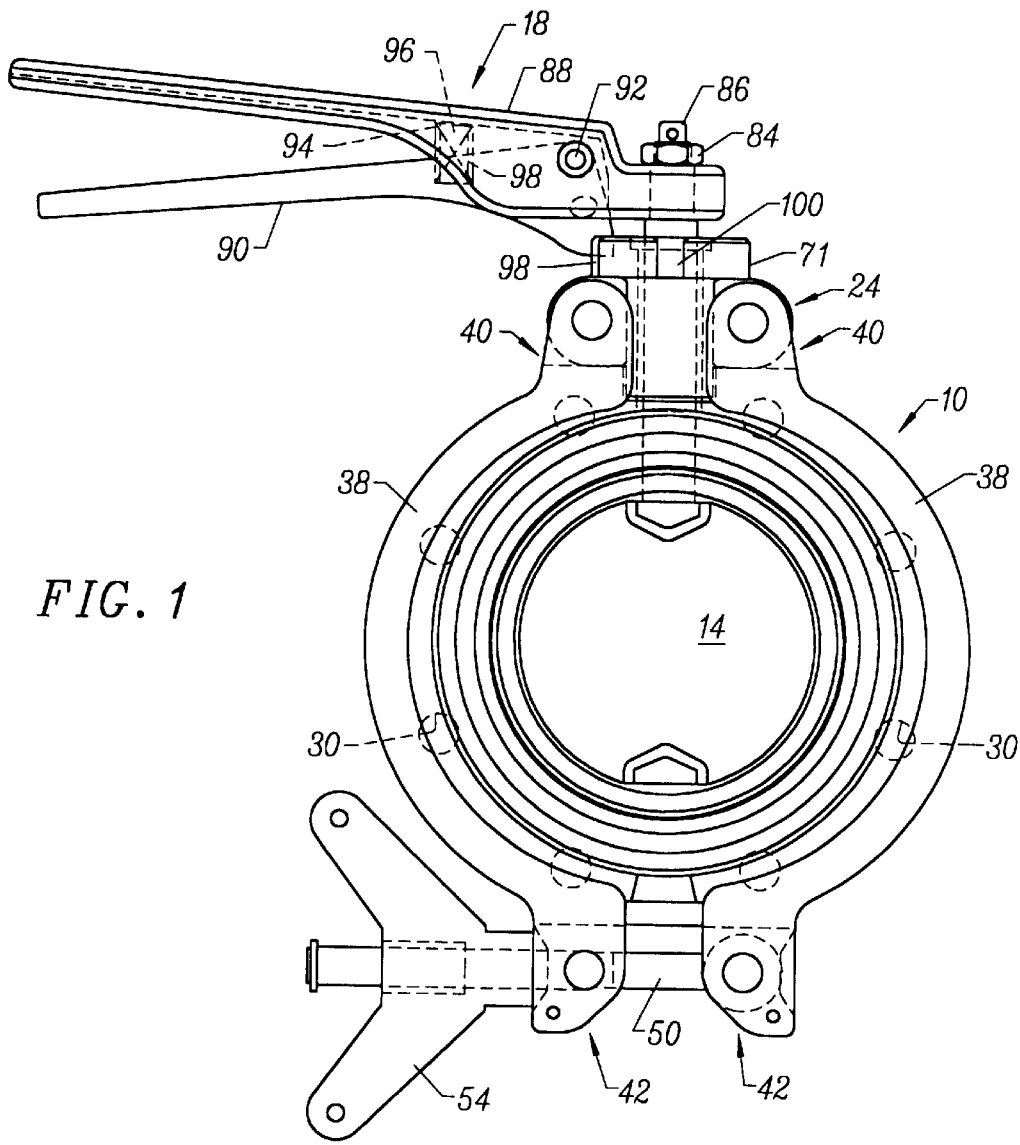
FIG. 1 is an end view of an embodiment of valve assembly in accordance with the present invention.

The valve assembly shown in the drawings comprises a valve housing 10 having a through passage 12 within which a generally disc-shaped valve closure flap 14 is pivotally mounted. The valve closure flap 14 is secured to upper and lower spindles 16, 17 and is pivotable between open and closed positions by means of a handle assembly 18 secured to one end of the upper spindle 16.

Figure 4:
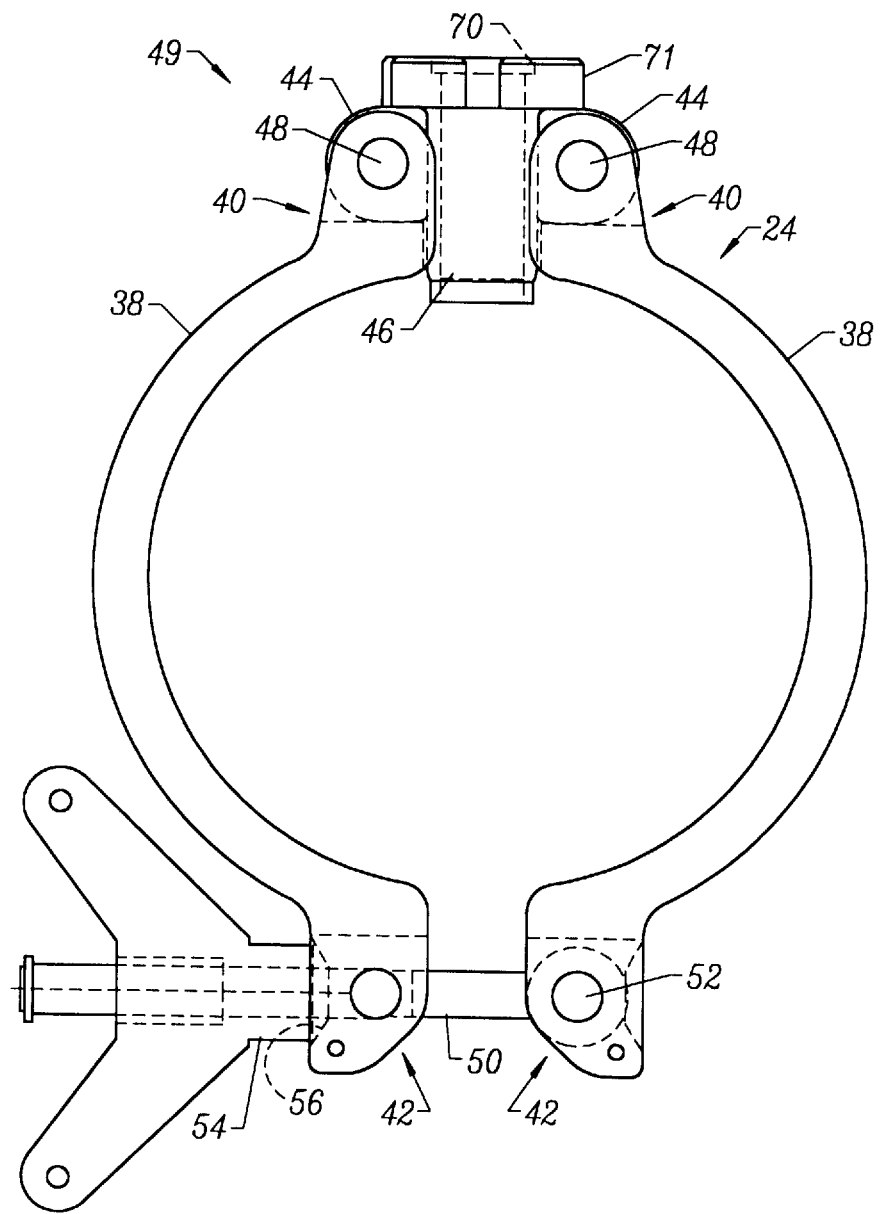
FIG. 4 is an end view of a clamp used in the valve assembly of FIG. 1.
Figure 6:
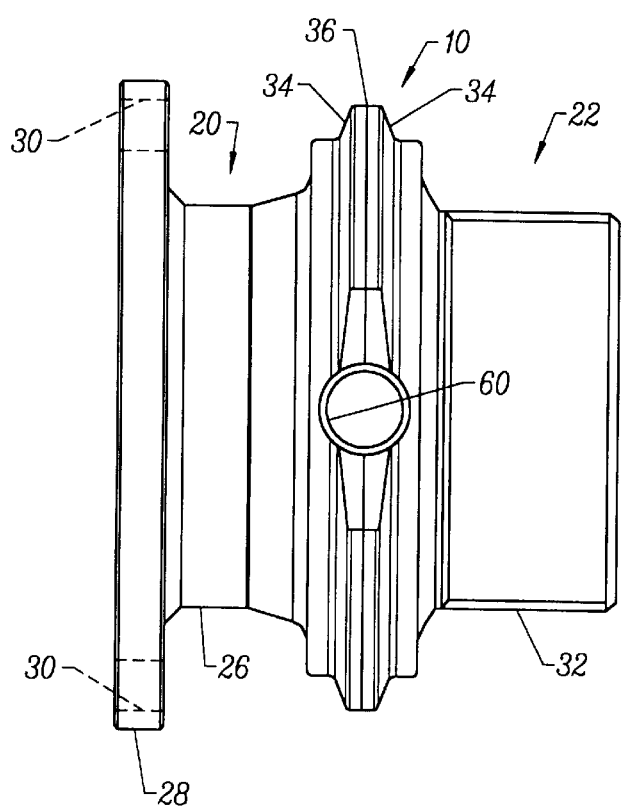
FIG. 6 is a plan view of the valve assembly of FIG. 1, with the clamp of FIG. 4 removed therefrom.

As best seen in FIG. 6, the valve housing 10 is formed in two sections, an inlet section 20 and an outlet section 22, which in use are releasably secured together by means of a generally annular clamp 24 (FIG. 4). The inlet section 20 has a tubular portion 26 to the outer end of which an annular securing flange 28 having a plurality of bolt-receiving apertures 30 is welded. The outlet section comprises an externally threaded tubular portion 32, and the inner ends of each of the inlet and outlet sections are formed into identical, planar-faced securing flanges 34, which when the flanges 34 are abutted against each other with their flat end faces in contact, form a peripheral securing rib 36 which is symmetrical about the joint plane between the two housing sections 20,22. As will be explained in more detail, the securing rib 36 is complementarily shaped with the inner surface of the clamp 24, in order to hold the valve assembly together releasably.

Figure 5:
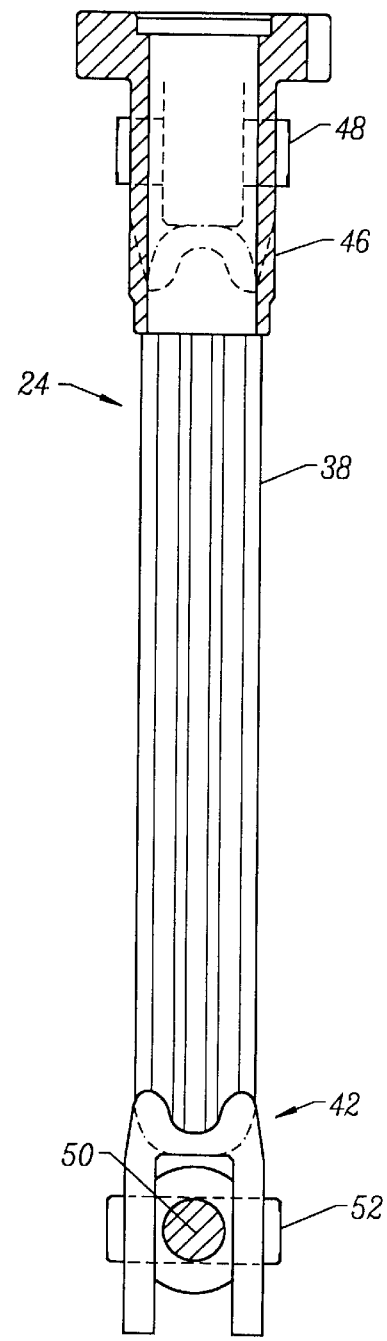
FIG. 5 is a cross-sectional side elevation of the clamp of FIG. 4.

The clamp 24 comprises two identical arcuate arms 38 one end of each of which is formed into a first clevis portion 40 and the other end of each of which is formed into a second clevis portion 42. Each of the first clevis portions 40 is pivotally mounted onto a respective one of two diametrically opposed radially extending planar lugs 44 extending from a tubular pivot boss or collar 46, by means of a pivot pin 48 which is staked in position. The clamp is securable in position around the peripheral rib 36 by means of a swing bolt assembly 49. The swing bolt assembly 49 includes a threaded clamping bolt 50 which is pivotally secured at one end to the other clevis portion 42 of one of the arms by means of a staked pivot pin 52. The bolt 50 threadably receives a wing nut 54 which, by advancing it along the bolt 50, is engageable with a recess 56 in the end of the other arcuate arm 38. As best seen in FIG. 5, the internal surface of the arcuate arms 38 is profiled to receive the peripheral rib 36 as a complementary fit, and once the clamp 24 is in position it may be secured by tightening the wing nut 54 against the associated recess 56 of the clevis 42.

Figures 7, 8:
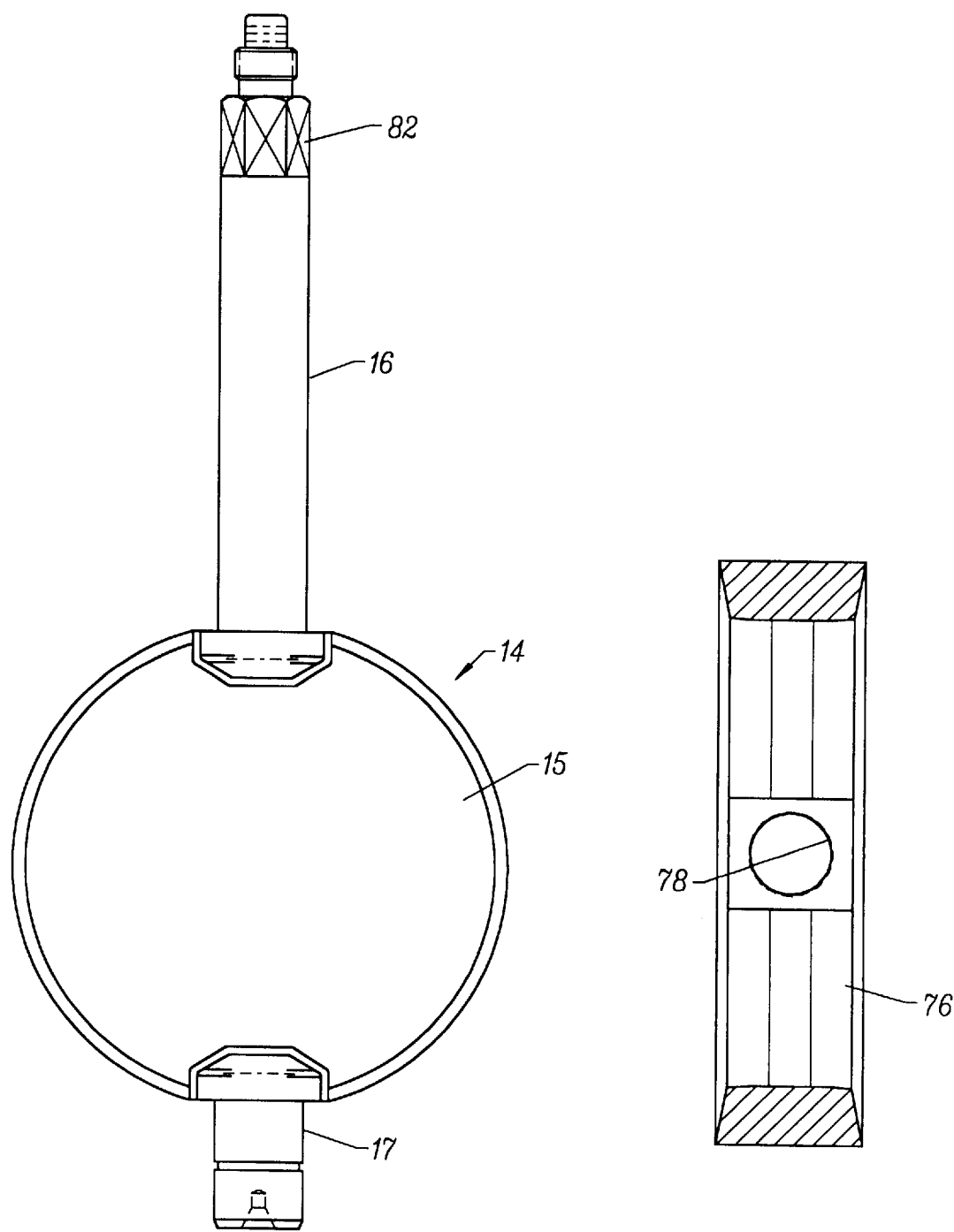
FIG. 7 is a side elevation of a valve closure member used in the valve assembly of FIG. 1.
FIG. 8 is a cross-sectional side elevation through a seal of the valve assembly of FIG. 1.

Referring to FIG. 7, the valve closure flap 14 is a generally planar disc 15 which, in use, is located within the through passage 12 of the valve housing at the junction of the two valve housing sections 20,22 and is fixedly mounted between the upper spindle 16 and the lower spindle 17, the upper and lower spindles, in use, being received in elongate, radially extending upper and lower bores 60,62 in the securing rib 36, one half of each of the bores 60,62 being provided in each of the housing sections 20,22, whereby the pivotal axis of the valve closure member lies in the junction plane of the two planar faces. The upper spindle 16 also receives upper and middle spindle bushes 64,66 both of 25% glass-filled PTFE. The upper end of the upper spindle bush 64 is provided with a peripheral locating flange 68 which, in use, is received in a complementarily shaped recess 70 in an enlarged head 71 in the upper end of the pivot boss 46. The lower end of the lower spindle 17 is also provided with a single 25% glass-filled PTFE bush 72. The through passage 12 of the housing is also provided with a circumferential recess 74 radially inwardly of the securing rib 36, one half of the recess being provided in each of the valve housing sections 20,22. The recess 74 receives an annular valve seal 76 (FIG. 8) which has diametrically opposed apertures 78 for passage of the upper and lower spindles 16, 17.

The valve assembly is assembled as follows. Firstly, the upper and lower spindles 16,17 are passed through a respective one of the diametrically opposed apertures 78 in order to locate the seal around the valve closure flap 14. The middle spindle bush 66 is then located on the upper spindle 16 and the lower spindle bush 72 is located on the lower spindle 17. The upper spindle 16, carrying the middle spindle bush 66 is then passed through the spindle boss 46, the upper spindle bush 64 is fitted onto the upper spindle 16 and the handle assembly 18 is secured onto a hexagonally-formed protruding portion 82 of the upper spindle and held in position by means of a nut 84 which is threadedly mounted on a threaded end shank portion 86 of the upper spindle 16.

The assembled clamp 24, valve spindles 16,17, valve closure flap 14, valve seal 76, handle assembly 18 and various bushes 64,66,72 are then offered to the inlet section 20 with the arcuate arms 38 pivoted outwardly, such that the upper and lower spindles 16,17 are located in one half of the upper and lower bores 60,62 respectively in the securing rib 36 and the annular valve seal 76 is seated in one half of the circumferential recess 74. The outlet housing section 22 is then offered to the remainder of the valve assembly, such that the upper and lower spindles 16,17 are received in the other half of the upper and lower bores 60,62 respectively and the annular valve seal 76 is seated in the other half of the circumferential recess 74. The arcuate arms 38 are then pivoted downwardly, thereby receiving the two halves of the securing rib 36 within the inwardly concave recesses of the arms 38. The lower ends of the arms 38 are then drawn together by pivoting the clamping bolt to the horizontal and advancing the wing nut 54 along the bolt 50 so that it engages the recess 56 tightly, thereby securing together the two parts of the housing and holding the valve closure member 14 and spindles 16,17 securely within the housing. A stainless steel plug 86 is then pushed into the lower bore 62 in the securing rib 36 to close off the bore 62.

Figure 2:
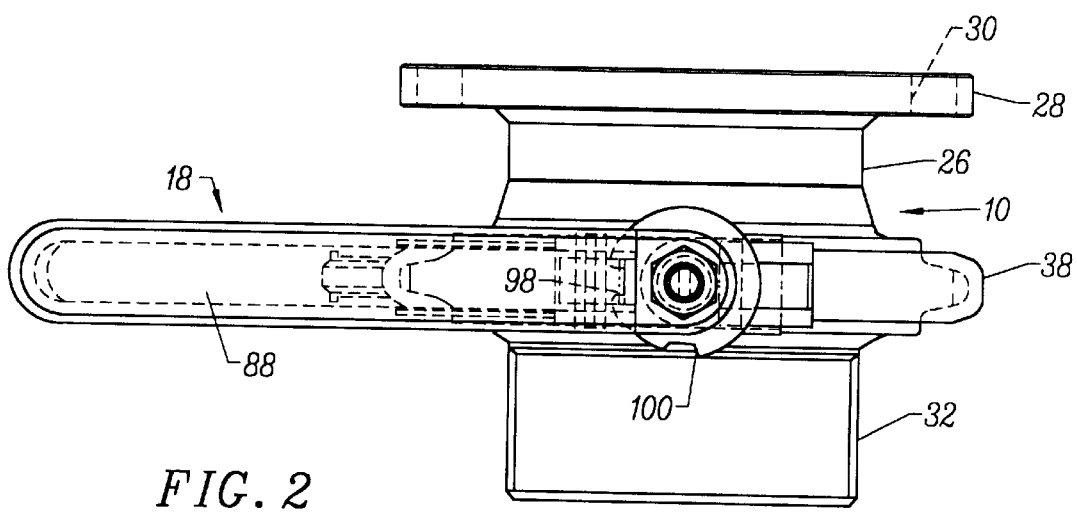
FIG. 2 is a plan view of the valve assembly of FIG. 1.
Figure 3:
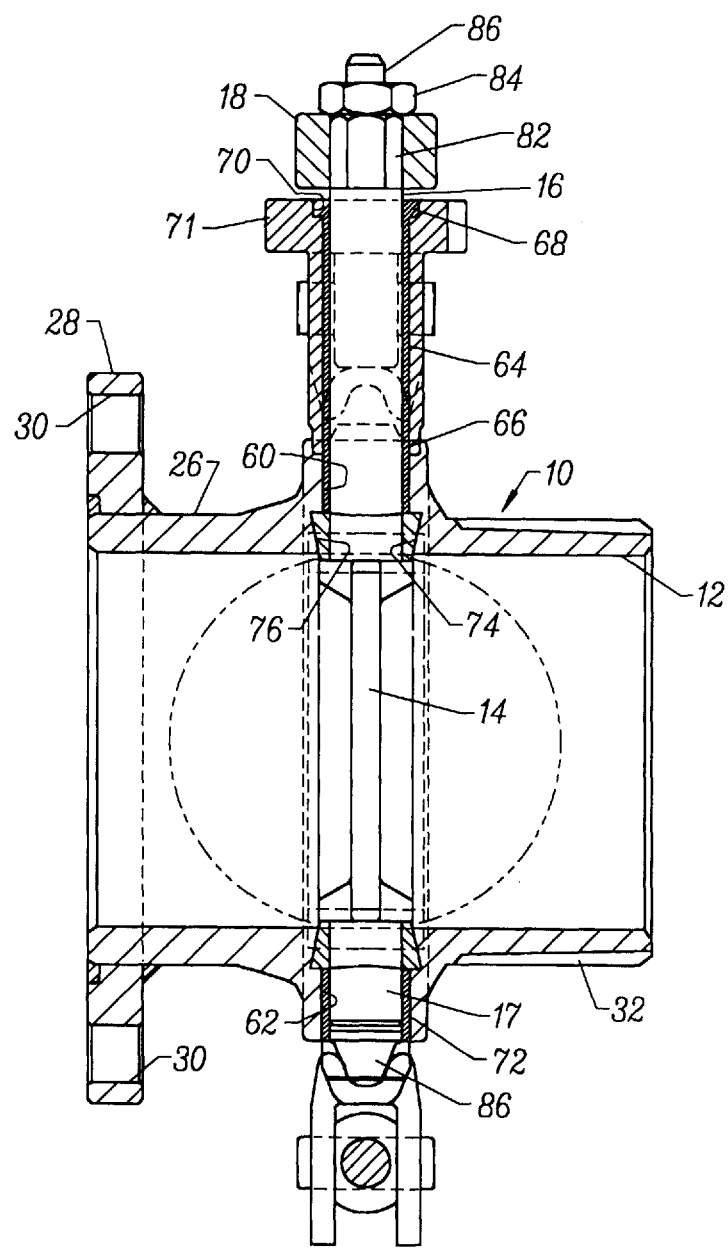
FIG. 3 is a cross-sectional side elevation through the valve assembly of FIG. 1.

The valve may then be operated as follows. The handle assembly 18 comprises a handle 88 secured to the hexagonal protruding portion 82 of the upper spindle 16 and a locking lever 90 pivotally mounted to the handle 88 by means of a pivot pin 92 and resiliently urged away from the handle by means of a compression spring 94 received on a boss 96 in the undersurface of the handle and seated in a recess 98 in the opposed surface of the lever 90. As best seen in FIG. 2, the enlarged head 71 of the spindle boss is provided with two recess 98,100 angularly spaced by 90°, each of which is shaped to receive a portion of the locking lever 90 and thereby secure the handle 88, and thereby the valve closure flap 14, in either a closed position (as illustrated in the Figures) or an open position at 90° to the closed position. To move the handle 88 from one extreme position the lever 90 is depressed towards the handle against the restoring force of the spring 94, thereby disengaging the end of the lever from the recess 98,100 in which it is located and enabling the handle 88 (and the valve closure flap 14) to be pivoted through 90° to the alternative extreme position. If the lever 90 is released when the handle is in one of its extreme positions, the end of the lever engages with the recess 98,100 by virtue of the force of the spring 94.

If it is desired to dismantle the valve assembly, e.g. to clean the valve assembly or replace any of its components, the wing nut 54 is unscrewed along the bolt 50, and eventually the bolt 50 can be pivoted on its pivot 52 to free the nut 54 from the vicinity of its clevis portion 42. The clamp 24 can then be swung away, whereupon the two valve housing sections 20,22 can be separated and the valve closure member 14 and spindles 16,17 can be removed from the assembly attached to the clamp 24. Once the required cleaning or replacement of parts has been carried out the valve assembly is then re-assembled by reversing the above process.

We claim:

1. A valve assembly comprising a valve body, a valve closure member rotationally mounted within said valve body and rotatable between open and closed positions, said valve body comprising two valve body sections which in use abut each other to form said valve body and a clamp which is engageable with the exterior of the valve body sections for releasably securing together the two valve body sections, the clamp comprising a collar through which a spindle is connected to said valve closure member, two arcuate arms pivotally mounted on opposite sides of said collar and means for releasably securing said two arcuate arms in position with respect to each other.

2. A valve assembly as claimed in claim 1, wherein each of said valve body sections comprises a planar face which abuts the planar face of the other of said valve body sections, the pivotal axis of said valve closure member lying in the junction plane of said two planar faces.

3. A valve assembly as claimed in claim 1, wherein said clamp in use engages with at least a portion of a circumference of said valve body.

4. A valve assembly as claimed in claim 1, wherein said clamp is generally annular.

5. A valve assembly as claimed in claim 1, wherein each of said valve body sections is provided with a projection which is engageable with the clamp to secure together said two body sections.

6. A valve assembly as claimed in claim 5, wherein said projection comprises a peripheral rim.

7. A valve assembly as claimed in claim 6, wherein said peripheral rim is located adjacent to the abutment area of said two valve body sections.

8. A valve assembly as claimed in claim 7, wherein each said peripheral rim forms part of a generally planar face of the respective valve body section, said generally planar faces of the two valve body sections, in use, abutting each other.

9. A valve assembly as claimed in claim 5, wherein said projections are in use received in a groove in said clamp.

10. A valve assembly as claimed in claim 9, wherein the cross-section of said projections and of said groove in said clamp are complementarily-shaped.

11. A valve assembly as claimed in claim 1, wherein said means for securing said two arms in a fixed position with respect to each other comprises a swing bolt assembly.

12. A valve assembly as claimed in claim 1, wherein said arcuate arms are substantially identical.

13. A valve assembly as claimed in claim 12, wherein said arcuate arms are generally semi-annular.

14. A valve assembly as claimed in claim 1, comprising a butterfly valve.

15. A valve assembly as claimed in claim 1, comprising mounting means for mounting said valve assembly in position.

16. A valve assembly as claimed in claim 15, wherein said mounting means comprises a peripheral flange having a plurality of apertures therein.

17. A valve assembly as claimed in claim 1, further comprising a removable valve seal with which said valve closure member is engageable in order to close the valve.

18. A valve assembly as claimed in claim 17, wherein said valve seal is seated with a recess in said valve body.

19. A valve assembly as claimed in claim 17, wherein a spindle of said valve closure member passes through a portion of said valve seal.

20. A valve assembly as claimed in claim 1, further comprising a handle connected to said valve closure member for displacing said valve closure member.

21. A valve assembly comprising a valve body, a valve closure member rotationally mounted within said valve body and rotatable between open and closed positions, said valve body comprising two valve body sections which in use abut each other to form said valve body and a clamp which is engageable with the exterior of the valve body sections for releasably securing together the two valve body sections, the clamp comprising a collar which receives a spindle connected to said valve closure member, two arcuate arms pivotally mounted on opposite sides of said collar and means for releasably securing said two arcuate arms in position with respect to each other, wherein said valve closure member is mounted at the junction of said two valve body sections.

22. A valve assembly as claimed in claim 21, wherein said valve closure member comprises first and second mounting spindles which are rotationally mounted in first and second apertures formed in said valve body, each of said spindle-receiving apertures being formed by aligned recesses in said first and second valve body sections.

23. A valve assembly as claimed in claim 21, wherein the collar of the clamp is aligned with the junction between the valve body portions so that the collar supports the spindle from adjacent the first body portion and from adjacent the second body portion.

24. A valve assembly comprising:

a valve body including a first valve body portion having a first recess and a second recess and a second valve body portion abutting the first valve body portion, the second valve body portion having a first recess adjacent to the first recess of the first body portion and a second recess adjacent to the second recess of the first body portion so as to define a pair of spindle apertures;

a clamp engageable with exterior surfaces of the valve body for releasably securing together the first and second valve body portions, the clamp including a collar, two arcuate arms pivotally mounted on opposite sides of the collar, and a mechanism to secure the relative positions of the arms; and a valve closure member mounted on first and second spindles, the first and second spindles being received by the spindle apertures of the valve body, the first spindle passing through the collar of the clamp so that the valve closure member is rotatable within the valve body between open and closed positions.

25. A valve assembly as claimed in claim 24, wherein the clamp adjacent the securing mechanism is separated from the second spindle.

* * * * *